: 3,116,273
Patented Dec. 31, 1963

3,116,273
POLYMERIZATION OF BUTADIENE WITH A MoCl₅—AlR₃-ETHER OR AMINE OR AMIDE-IODINE CATALYST
Floyd E. Naylor, Bartlesville, Okla., and Bruce V. Ettling, Pullman, Wash., assignors to Phillips Petroleum Company, a corporation of Delaware
No Drawing. Filed Oct. 31, 1960, Ser. No. 65,958
5 Claims. (Cl. 260—94.3)

This invention relates to a process for polymerizing 1,3-butadiene so as to obtain rubbery polymers. In one aspect, the invention relates to a process for producing a polybutadiene containing a high percentage of 1,2-addition. In another aspect, the invention relates to a process for preparing a rubbery polybutadiene which can be readily processed.

In recent years there has been a great deal of activity in the development of processes for producing olefin polymers. Polymers of mono-olefins, such as ethylene and propylene, prepared by these processes have received wide acceptance by many industries. The more recent discovery in the field of diene polymerization of certain so-called stereospecific catalysts, which make possible the formation of polymers having a desired configuration, has aroused considerable interest. The polymers formed by the use of these catalysts often have outstanding physical properties which render them equal to or even superior to natural rubber. The present invention is concerned with an improvement in a process for preparing a polybutadiene containing a high percentage of 1,2-addition.

It is an object of this invention to provide a novel process for producing a rubbery polymer of 1,3-butadiene.

Another object of the invention is to provide a process for polymerizing 1,3-butadiene so as to produce a rubbery polymer which contains a high percentage of 1,2-addition and which is readily processable.

Other and further objects and advantages of the invention will become apparent to those skilled in the art upon consideration of the accompanying disclosure.

In copending U.S. patent application Serial No. 62,552, filed on October 14, 1960, by F. E. Naylor, there is disclosed a process for preparing rubbery polymers of 1,3-butadiene with a catalyst comprising molybdenum pentachloride and an organoaluminum compound. When polymerizing butadiene with a catalyst consisting of molybdenum pentachloride and an organoaluminum compound, a resinous insoluble polymer product is obtained. As described in the copending application, rubbery polymers of butadiene can be prepared with the molybdenum pentachloride-organoaluminum catalyst if the polymerization is conducted in the presence of a promoter such as an ether, an amine or an amide. It has been found, however, that the rubbery polymers produced by this process generally have a very high inherent viscosity, a fact which renders the polymers difficult to process. The present invention is concerned with an improvement in the process described in the copending application in that it makes possible the production of butadiene polymers having an inherent viscosity which is in a processable range. Broadly speaking, in a process for polymerizing 1,3-butadiene with a catalyst comprising an organoaluminum compound having the formula $R_3Al$, wherein R is an alkyl, aryl, alkaryl, aralkyl, or cycloalkyl radical, preferably containing from 1 to 12, inclusive, carbon atoms, and molybdenum pentachloride and in the presence of a promoter selected from the group consisting of ethers, amines, and amides, the improvement resides in conducting the polymerization in the presence of an iodine-containing component selected from the group consisting of iodine and an organometal iodide. The presence of the iodine-containing components results in significant lowering of the inherent viscosity of the product produced in the presence of the system containing the three components, i.e., the catalyst and promoter. In general, the polybutadiene products have an inherent viscosity which does not exceed 3.0, and such a product can be readily processed. The products have a vinyl content of at least 75 percent, generally 80 percent or higher.

Examples of compounds corresponding to the formula $R_3Al$ include trimethylaluminum, triethylaluminum, triisobutylaluminum, tri-n-decylaluminum, tri-sec-eicosyl-aluminum, tribenzylaluminum, triphenylaluminum, trinaphthylaluminum, tri-p-tolylaluminum, tricyclohexylaluminum, tri(4-methylcyclohexyl)aluminum, tri(4-butylcyclohexyl)aluminum, tri(4-cyclohexylbutyl)aluminum, and the like.

As mentioned hereinbefore, the polymerization process is conducted in the presence of certain compounds which promote the formation of rubbery rather than resinous products. Promoters used in the process are ethers, amines and amides, and they preferably contain up to and including 20 carbon atoms per molecule with the hydrocarbon radicals each containing from 1 to 12, inclusive, carbon atoms. The promoters are preferably selected from the group consisting of dialkyl ethers, cyclic ethers; ethers of ethylene glycol; tertiary amines, which may contain not more than one aryl group; N,N-dialkyl-substituted amides; and alkylideneamines. The latter compounds are often referred to as Schiff bases, i.e., the reaction product formed by the reaction of a primary amine with an aldehyde or ketone. Examples of compounds suitable for use as promoters include dimethyl ether, diethyl ether, diisopropyl ether, di-n-propyl ether, di-n-butyl ether, di-n-octyl ether, didecyl ether, methyl ethyl ether, ethyl n-propyl ether, tert-butyl n-dodecyl ether, n-hexyl n-decyl ether, di-tert-heptyl ether, tetramethylene oxide (tetrahydrofuran), 1,3-dioxane, 1,4-dioxane, 1,2-dimethoxyethane, 1,2-diethoxyethane, 1,2-di-n-propoxyethane, methoxyethoxyethane, methoxy-n-pentoxyethane, ethoxy-n-hexoxyethane, di-n-nonoxyethane, trimethylamine, triethylamine, tri-n-propylamine, tri-n-butylamine, tri-tert-butylamine, tri-n-hexylamine, methyldiethylamine, dimethylhexylamine, n-butyl-di-n-octylamine, di-tert-butyl-n-dodecylamine, methyl-n-propylamine, N,N-dimethylaniline, N-methyl-N-ethylaniline, N,N-diisopropylaniline, N,N-di-n-butylaniline, N- ethyl-N-dodecylaniline, N,N-di-n-butyl-4-toluidine, N-methylmorpholine, N-octylmorpholine, N-tert-hexylmorpholine, N-dodecylmorpholine, pyridine, 2,4,6-trimethylpyridine, 3,5-di-n-hexylpyridine, 4-tert-butylpyridine, N-methylpiperidine, N-isopropylpiperidine, N-dodecylpiperidine, N,N-dimethylformamide, N,N-diethylacetamide, N-methyl-N-n-butylpropionamide, N,N-di-n-hexylcaprylamide, N,N-di-n-octylformamide, N-benzylideneaniline, N-propylideneaniline, N-butylideneaniline, N-(1-ethylbutylidene)-4-toluidine, N-(1-n-butyloctylidene)aniline, N-butylidene-n-butylamine, N-ethylidenethylamine, N-benzylidenethylamine, and N-benzylidenedodecylamine.

The iodine-containing component used in the process is selected from the group consisting of iodine and a compound having the formula $R'_xAlI_y$, wherein $R'$ is an alkyl, aryl, alkaryl, aralkyl, or cycloalkyl radical and wherein $x$ and $y$ are integers, the sum of $x$ and $y$ being equal to 3, the valence of the aluminum. It is usually preferred to use iodine as the iodine-containing component. However, as indicated, organoaluminum iodides can also be advantageously employed in the process. Examples of such compounds include dimethylaluminum iodide, diethylaluminum iodide, diisobutylaluminum iodide, methylethylaluminum iodide, di-n-decylaluminum iodide, di-sec-ecosylaluminum iodide, benzylaluminum diiodide, phenylaluminum diiodide, dinaphthylaluminum iodide, dicyclohexylaluminum iodide, di(4-methylcyclohexyl)aluminum iodide, di(4-butylcyclohexyl)aluminum iodide, 4-cyclohexylbutylaluminum diiodide, and the like. One specific combination which can be used comprises the use of triphenylaluminum, molybdenum pentachloride, methyl ethyl ether, and diethylaluminum iodide.

The amount of the organoaluminum compound present in the catalyst system is usually in the range of 0.9 to 3 mols, preferably from 1 to 2 mols of the organoaluminum compound per mol of molybdenum pentachloride. The amount of the catalyst which is used in the polymerization can be varied over a rather wide range. However, the concentration of the total catalyst composition is generally in the range of 0.1 to 10 weight percent or higher, preferably in the range of 0.25 to 6.0 weight percent, based on the total amount of 1,3-butadiene charged to the polymerization reaction.

The amount of the promoter used in the process can vary within rather wide limits and is dependent upon several factors. For optimum results the amount of the promoter depends upon the particular compound used as well as upon the organoaluminum compound employed in the catalyst system. It is only necessary to employ a relatively small amount of the promoter. In some instances, a large excess of the promoter can be tolerated without deleterious effects on the conversion while in other cases a marked decrease in conversion is observed as the amount of promoter is increased above the optimum. The amount of promoter will usually be in the range of 0.1 to 30 mols per mol of molybdenum pentachloride. However, the preferred ratio is from 0.5 to 10 mols of promoter per mol of molybdenum pentachloride, and very frequently less than 4 or 5 mols of the promoter per mol of molybdenum pentachloride is employed. Furthermore, it has been found that in many instances the optimum quantity of the promoter is in the neighborhood of 1 mol of promoter per mol of molybdenum pentachloride. It is usually desired to employ as little of the promoter as possible while still obtaining a rubbery polymer having a high vinyl content, and it is well within the skill of the art to operate in this manner.

Only a comparatively small amount of the iodine-containing component is necessary in order to obtain the improved products of this invention. The amount of the iodine-containing component is generally in the range of 0.2 to 1 mol per mol of the $R_3Al$ compound.

It is usually preferred to carry out the polymerization in the presence of a diluent. Diluents suitable for use in the polymerization process are hydrocarbons which are not detrimental to the polymerization reaction and which are liquid under conditions of the process. It is generally preferred to utilize aromatic hydrocarbons as diluents, such as toluene, benzene, ethylbenzene, xylene, and the like. Cycloaliphatic hydrocarbons, such as cyclohexane, cyclopentane, methylcyclohexane, and the like can also be used although they are less desirable than the aromatic hydrocarbons.

The polymerization process of this invention can be carried out at temperatures varying over a relatively wide range. It is usually preferred to operate at a temperature between 0 and 150° C., and more desirably at a temperature in the range of 10 to 80° C. The polymerization can be carried out under autogenous pressure or at any pressure suitable for maintaining the reaction mixture substantially in the liquid phase. The pressure will thus depend upon the particular diluent being employed and the temperature at which the polymerization is conducted. However, higher pressures can be employed if desired, these pressures being obtained by some such suitable method as the pressurization of the reactor with a gas which is inert with respect to the polymerization reaction.

The process of this invention can be carried out as a conventional batch operation or as a continuous operation. When operating as a batch process, according to one charging procedure, the diluent, e.g., toluene, is charged to the polymerization reactor initially after which the reactor is purged with an inert gas. The molybdenum pentachloride is then added as a solid after which a solution of the iodine-containing component is charged. Thereafter, the promoter and the $R_3Al$ compound is charged to the reactor followed by the 1,3-butadiene. However, it is to be understood that the invention is not to be limited to any particular charging procedure. The process can also be carried out continuously by maintaining the above-mentioned concentration of reactants in the reactor for a suitable residence time. The residence time in a continuous process will, of course, vary within rather wide limits depending upon such variables as temperature, pressure, the ratio of catalyst components and the catalyst concentration. In a continuous process, the residence time will usually fall within the range of 1 second to 5 hours when conditions within the specified ranges are employed. When a batch process is utilized, the time for the reaction can be as high as 24 hours or more.

Various materials are known to be detrimental to the catalyst composition of this invention. These materials include carbon dioxide, oxygen and water. Accordingly, it is desirable that the butadiene be freed of these materials as well as other materials which may tend to inactivate the catalyst. Any of the known means for removing such contaminants can be used. Furthermore, when a diluent is used in the process, it is preferred that this material be substantially free of impurities such as water, oxygen and the like. In this connection, it is desirable to remove air and moisture from the reaction vessel in which the polymerization is to be conducted. Although it is preferred to carry out the polymerization under anhydrous or substantially anhydrous conditions, it is to be understood that some small amounts of these catalyst-inactivating materials can be tolerated in the reaction mixture. However, it is also to be understood that the amount of such materials which can be tolerated in the reaction mixture is insufficient to cause complete deactivation of the catalyst.

Upon completion of the polymerization reaction, when a batch process is used, the reaction mixture is then treated to inactivate the catalyst and recover the rubbery product. Any suitable method can be utilized in carrying out this treatment of the reaction mixture. In one method, the polymer is recovered by steam stripping the diluent from the polymer. In another suitable method, the catalyst-inactivating material, such as an alcohol, is added to the mixture so as to inactivate the catalyst and cause precipitation of the polymer. The polymer is then separated from the alcohol and diluent by any suitable method, such as decantation or filtration. It is often preferred to add initially only an amount of the catalyst-inactivating material which is sufficient to inactivate the catalyst without causing precipitation of the dissolved polymer. It has also been found to be advantageous to add an antioxidant, such as phenyl-beta-napthylamine to the polymer solution prior to the recovery of the polymer. After addition of the catalyst-inactivating agent and the antioxidant, polymer present in the solution can then be separated by addition of an excess of a material such as ethyl alcohol or isopropyl alcohol. When the process is carried out continuously, the total effluent from the reactor can be pumped from the reactor to a catalyst-inactivating zone where the reactor effluent is contacted with a suitable catalyst-inactivating material, such as an alcohol. When an alcohol is used as the catalyst-inactivating material, it also functions to precipitate the polymer. In the event catalyst-inactivating materials are employed which do not perform this dual role, a suitable material, such as an alcohol, can then be used to precipitate the polymer. It is, of course, to be realized that it is within the scope of the invention to employ other suitable means to recover the polymer from solution. After separation from the water or alcohol and diluent by filtration or other suitable means, the polymer is then dried.

The polybutadiene produced in accordance with the process of this invention is a rubbery polymer having at least 80 percent 1,2-addition and having an inherent viscosity not greater than 3.0. The term "rubbery polymer" as used herein includes elastomeric vulcanizable polymeric material which after vulcanization, i.e., cross-linking, possesses the properties normally associated with vulcanized rubber including materials which when compounded and cured exhibit reversible extensibility at 80° F. of over 100 percent of a specimen's original length with a retraction of at least 90 percent within one minute after release of the stress necessary to elongate to 100 percent.

The rubbery polymers of this invention can be compounded and vulcanized in a manner similar to that used in the past for compounding natural and synthetic rubbers. Vulcanization accelerators, vulcanizing agents, reinforcing agents, and fillers such as have been used in natural rubber can likewise be used when compounding the rubbers of this invention. The rubbery polymers produced in accordance with this invention have utility in applications where natural and synthetic rubbers are used. The polymers have a low heat buildup and high resistance to oxidation and blowout, characteristics which make them particularly valuable for heavy duty applications. They can be blended with other polymers such as cis-polybutadiene to improve the processing characteristics. They can be used in the manufacture of automobile tires and other rubber articles, such as gaskets, tubing, covering for wire cable, rubber heels, rubber tires, and the like.

A more comprehensive understanding of the invention can be obtained by referring to the following illustrative examples, which are not intended, however, to be unduly limitative of the invention.

Samples of certain of the polymer products produced in the runs described in the samples were examined by infrared analysis. This work was carried out in order to determine the percentage of the polymers formed by 1,2-addition of the butadiene. The procedure used in making these determinations is described hereinafter.

The polymer samples were dissolved in carbon disulfide to form a solution having 25 grams of polymer per liter of solution. The infrared spectrum of each of the solutions (percent transmission) was then determined in a commercial infrared spectrometer.

The percent of total unsaturation present as trans 1,4- was calculated according to the following equation and consistent units:

$$\epsilon = \frac{E}{tc}$$

where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction was determined at the 10.35 micron band. The extinction coefficient was 146 (liters-mols$^{-1}$-centimeters$^{-1}$).

The percent of the total unsaturation present as 1,2- (vinyl) was calculated according to the above equation, using the 11.0 micron band. The extinction coefficient was 209 (liters-mols$^{-1}$-centimeters$^{-1}$).

The percent of the total unsaturation present as cis 1,4- was obtained by subtracting the trans 1,4- and 1,2- (vinyl) determined according to the above procedure, from the theoretical unsaturation, assuming one double bond per each $C_4$ unit in the polymer.

EXAMPLE I

Two runs were carried out in which 1,3-butadiene was polymerized. One of the runs was carried out according to the present invention while the other was a control run. The recipes used in the runs were as follows:

*Recipes*

| | Parts by Weight | |
|---|---|---|
| | 1 | 2 |
| Butadiene | 100 | 100. |
| Toluene | 1,200 | 1,200. |
| Molybdenum pentachloride (MoCl$_5$) | 1.1 (4 mmoles) | 1.1 (4 mmoles). |
| Triisobutylaluminum (TBA) | 0.95 (4,8 mmoles) | 0.95 (4,8 mmoles). |
| Dimethylaniline (DMA) | 0.48 (4.0 mmoles) | 0.48 (4.0 mmoles). |
| Iodine | 0.51 (2.0 mmoles) | |
| Time, hours | 17 | 17. |
| Temperature, C | 50 | 50. |

The polymerizations were effected in 7-ounce beverage bottles. In run 1, toluene was charged first followed by a 3-minute purge with prepurified nitrogen at the rate of 3 liters per minute. The molybdenum pentachloride was added as a solid after which the bottle was sealed with a self-sealing gasket which had been previously extracted with toluene, and capped with a crown bottle cap which was punched so as to expose a portion of the self-sealing gasket. A toluene solution of the iodine was then charged, and after one hour the dimethylaniline and triisobutylaluminum, each in toluene solution, were introduced. Butadiene was charged last. These latter materials were introduced from calibrated syringes with the syringe needle used for charging being inserted through the self-sealing gasket. Run 2 was effected in a manner similar to run 1 except that no iodine was used, and there was no waiting period between charging of any of the ingredients.

After all materials were charged, the bottles were placed in a 50° C. bath and tumbled throughout the polymerization period. The contents of each bottle was then poured while stirring into approximately 800 milliliters of isopropanol. The resulting coagulated polymer was separated by filtration, pressed to remove excess solvent, and washed with isopropanol. A solution of AO 2246 antioxidant [2,2'-methylene-bis(4-methyl-6-tert-butylphenol)] was mixed into the polymer (0.81 gram antioxidant per 100 grams polymer). The antioxidant solution was prepared by dissolving 52 grams of the compound in four liters of toluene and adding 100 milliliters of isopropanol. The products were dried overnight in a vacuum oven at 50° C. The mol ratios of the various ingredients, catalyst level, and results obtained in each of the runs are shown hereinbelow in Table I.

TABLE I

|  | Run 1 | Run 2 |
|---|---|---|
| Mol ratios: | | |
| TBA:MoCl₅ | 1.2:1 | 1.2:1 |
| DMA:MoCl₅ | 1.0:1 | 1.0:1 |
| I₂:TBA | 0.4:1 | |
| Total catalyst,[1] weight percent, based on monomer | 3.04 | 2.53 |
| Conversion, percent | 85 | 81 |
| Inherent viscosity [2] | 2.98 | 4.76 |
| Gel, percent [3] | 0 | 0 |
| Microstructure: | | |
| cis, percent | 14.5 | |
| trans, percent | 2.6 | |
| Vinyl, percent | 82.9 | |

[1] Includes TBA, MoCl₅, DMA, and I₂.
[2] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

The foregoing data show that the presence of iodine in the catalyst system gives a polymer having a much lower inherent viscosity than is obtained in a similar system but in the absence of iodine.

EXAMPLE II

A series of runs were carried out in which 1,3-butadiene was polymerized in accordance with the following recipes:

ratios of the various ingredients, catalyst level, and results obtained are shown below in Table II.

TABLE II

|  | Run | | | |
|---|---|---|---|---|
|  | 1 | 2 | 3 | 4 |
| Mol ratios: | | | | |
| TBA:MoCl₅ | 1.75:1 | 1.75:1 | 2:1 | 2:1 |
| THF:MoCl₅ | 1.6:1 | 1.6:1 | 2:1 | 2:1 |
| I₂:TBA | 0.67:1 | | 0.66:1 | |
| Total catalyst,[1] weight percent, based on monomer | 4.15 | 2.96 | 4.61 | 3.26 |
| Conversion, percent | 64 | 54 | 52 | 44 |
| Inherent viscosity [2] | 2.48 | 3.90 | 2.61 | 3.81 |
| Gel, percent [3] | 0 | 0 | 0 | 0 |
| Microstructure: | | | | |
| cis, percent | 14.2 | ([4]) | 12.4 | ([4]) |
| trans, percent | 2.0 | ([4]) | 1.9 | ([4]) |
| Vinyl, percent | 83.8 | ([4]) | 85.7 | ([4]) |

[1] Includes TBA, MoCl₅, THF, and I₂.
[2] One tenth gram of polymer was placed in a wire cage made from 80 mesh screen and the cage was placed in 100 ml. of toluene contained in a wide-mouth, 4-ounce bottle. After standing at room temperature (approximately 25° C.) for 24 hours, the cage was removed and the solution was filtered through a sulfur absorption tube of grade C porosity to remove any solid particles present. The resulting solution was run through a Medalia-type viscometer supported in a 25° C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.
[4] Not determined.

The effect of iodine in the catalyst system is demonstrated by the lower inherent viscosities of products from runs 1 and 3 as compared with the values obtained on products from runs 2 and 4.

Recipes

|  | Parts by Weight | | | |
|---|---|---|---|---|
|  | 1 | 2 | 3 | 4 |
| Butadiene | 100 | 100 | 100 | 100. |
| Toluene | 1,200 | 1,200 | 1,200 | 1,200. |
| Molybdenum pentachloride (MoCl₅) | 1.1 (4 mhm [1]) | 1.1 (4 mhm [1]) | 1.1 (4 mhm [1]) | 1.1 (4 mhm [1]). |
| Triisobutylaluminum (TBA) | 1.39 (7 mhm) | 1.39 (7 mhm) | 1.58 (8 mhm) | 1.58 (8 mhm). |
| Tetrahydrofuran (THF) | 0.47 (6.5 mhm) | 0.47 (6.5 mhm) | 0.58 (8 mhm) | 0.58 (8 mhm). |
| Iodine | 1.19 (4.7 mhm) | | 1.35 (5.3 mhm) | |
| Time, hours | 19 | 19 | 19 | 19. |
| Temperature, C | 50 | 50 | 50 | 50. |

[1] Millimoles per 100 parts monomers.

The polymerizations were effected in a manner similar to that described in Example I except for some variation in the charging order. In all runs toluene was charged first, after which the bottles were purged with nitrogen, and the molybdenum pentachloride was added followed by tetrahydrofuran. In runs 1 and 3, toluence solutions of triisobutylaluminum and iodine were mixed and the mixture was charged. Butadiene was added last. Mol

EXAMPLE III

A series of runs were carried out in which 1,3-butadiene was polymerized in the presence of molybdenum pentachloride, triethylaluminum, tetrahydrofuran and iodine. The procedure described in Example I was also followed in conducting these runs. The recipes used and the results obtained are shown hereinafter in Table III.

TABLE III

| | 1 | | 2 | | 3 | | 4 | | 5 | |
|---|---|---|---|---|---|---|---|---|---|---|
| | Parts[1] | Mmoles | Parts | Mmoles | Parts | Mmoles | Parts | Mmoles | Parts | Mmoles |
| Butadiene | 100 | -------- | 100 | -------- | 100 | -------- | 100 | -------- | 100 | -------- |
| Toluene | 1,200 | -------- | 1,200 | -------- | 1,200 | -------- | 1,200 | -------- | 1,200 | -------- |
| Molybdenum pentachloride, $MoCl_5$ | 2.2 | 8 | 1.1 | 4 | 1.1 | 4 | 1.1 | 4 | 1.1 | 4 |
| Triethylaluminum, TEA | 1.4 | 12 | 0.7 | 6 | 0.8 | 7 | 0.8 | 7 | 0.6 | 5 |
| Tetrahydrofuran, THF | 2.3 | 32 | 1.1 | 16 | 1.1 | 16 | 1.1 | 16 | 1.1 | 16 |
| Iodine | 0.64 | 2.5 | 0.32 | 1.25 | 0.32 | 1.75 | 0.89 | 3.5 | -------- | -------- |
| Mol ratios: | | | | | | | | | | |
| TEA:$MoCl_5$ | 1.5:1 | -------- | 1.5:1 | -------- | 1.75:1 | -------- | 1.75:1 | -------- | 1.25:1 | -------- |
| THF:$MoCl_5$ | 4:1 | -------- | 4:1 | -------- | 4:1 | -------- | 4:1 | -------- | 4:1 | -------- |
| $I_2$:TEA | 0.21:1 | -------- | 0.21:1 | -------- | 0.25:1 | -------- | 0.5:1 | -------- | -------- | -------- |
| Total catalyst, wt. percent, based on monomer | 6.54 | -------- | 3.22 | -------- | 3.32 | -------- | 3.89 | -------- | 2.8 | -------- |
| Time, hours | 18 | -------- | 18 | -------- | 15 | -------- | 15 | -------- | 15 | -------- |
| Temperature, °C | 50 | -------- | 50 | -------- | 50 | -------- | 50 | -------- | 50 | -------- |
| Conversion, percent | 100 | -------- | 82 | -------- | 87 | -------- | 86 | -------- | 99 | -------- |
| Inherent Viscosity[2] | 2.68 | -------- | 2.98 | -------- | 2.78 | -------- | 2.73 | -------- | 3.30 | -------- |
| Gel, percent[3] | 0 | -------- | 0 | -------- | 0 | -------- | 0 | -------- | 0 | -------- |
| Microstructure: | | | Not determined | | Not determined | | Not determined | | Not determined | |
| cis, percent | 16.4 | | | | | | | | | |
| trans, percent | 4.9 | | | | | | | | | |
| Vinyl, percent | 78.7 | | | | | | | | | |

[1] Parts by weight.
[2] One tenth gram of polymer was placed in a wire cage made from 80 mesh screen and the cage was placed in 100 ml of toluene contained in a wide-mouth, 4-ounce bottle. After standing at room temperature (approximately 25°C.) for 24 hours, the cage was removed and the solution was filtered through a sulfur absorption tube of grade C porosity to remove any solid particles present. The resulting solution was run through a Medalia-type viscometer supported in a 25°C. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample.
[3] Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

The data in Table III show that the products of runs 1 to 4, prepared in the presence of iodine, had lower inherent viscosities than the product of run 5, prepared in the absence of iodine.

As will be evident to those skilled in the art, many variations and modifications of this invention can be practiced in view of the foregoing disclosure. Such variations and modifications are believed to come within the spirit and scope of the invention.

We claim:

1. In a process for the polymerization of 1,3-butadiene with a catalyst comprising an organoaluminum compound having the formula $R_3Al$, wherein R is a radical selected from the group consisting of alkyl, aryl, alkaryl, aralkyl and cycloalkyl, and molybdenum pentachloride in the presence of a promoter selected from the group consisting of dimethyl ether, diethyl ether, diisopropyl ether, di-n-propyl ether, di-n-butyl ether, di-n-octyl ether, didecyl ether, methyl ethyl ether, ethyl n-propyl ether, tert-butyl n-dodecyl ether, n-hexyl n-decyl ether, di-tert-heptyl ether, tetramethylene oxide (tetrahydrofuran), 1,3-dioxane, 1,4-dioxane, 1,2-dimethoxyethane, 1,2-diethoxyethane, 1,2-di-n-propoxyethane, methoxyethoxyethane, methoxy-n-pentoxyethane, ethoxy - n - hexoxyethane, di-n-nonoxyethane, trimethylamine, triethylamine, tri-n-propylamine, tri-n-butylamine, tri-tert-butylamine, tri-n-hexylamine, methyldiethylamine, dimethylhexylamine, n - butyl - di - n-octylamine, di-tert-butyl-n-dodecylamine, methylethyl-n-propylamine, N,N-dimethylaniline, N-methyl-N-ethylaniline, N,N-diisopropylaniline, N,N-di-n-butylaniline, N-ethyl-N-dodecylaniline, N,N - di - n - butyl-4-toluidine, N-methylmorpholine, N-octylmorpholine, N-tert-hexylmorpholine, N-dodecylmorpholine, pyridine, 2,4,6-trimethylpyridine, 3,5-di-n-hexylpyridine, 4-tert-butylpyridine, N-methylpiperidine, N-isopropylpiperidine, N-dodecylpiperidine, N,N-dimethylformamide, N,N-diethylacetamide, N-methyl-N - n - butylpropionamide, N,N-di-n-hexylcaprylamide, N, N-di-n-octylformamide, N-benzylideneaniline, N-propylideneaniline, N-butylideneaniline, N-(1-ethylbutylidene)-4-toluidine, N-(1-n-butyloctylidene)aniline, N-butylidene-n-butylamine, N-ethylidenethylamine, N-benzylidenethylamine, and N-benzylidenedodecylamine, the amount of said organoaluminum compound being in the range of 0.9 to 3 mols per mol of said molybdenum pentachloride, and the amount of said promoter being in the range of 0.1 to 30 mols per mol of said molybdenum pentachloride, the improvement which comprises conducting said polymerization in the presence of iodine, the amount of iodine being in the range of 0.2 to 1 mol per mol of organoaluminum compound.

2. A process for preparing a rubbery polybutadiene containing a high percentage of 1,2-addition which comprises contacting 1,3-butadiene in a polymerization zone containing a hydrocarbon diluent with a catalyst comprising triisobutylaluminum and molybdenum pentachloride in the presence of dimethylaniline, the amount of said triisobutylaluminum being in the range of 0.9 to 3 mols per mol of said molybdenum pentachloride, and the amount of said dimethylaniline being in the range of 0.1 to 30 mols per mol of said molybdenum pentachloride, said contacting occurring at a temperature in the range of 0 to 150° C. and under autogenous pressure; adding to said polymerization zone iodine in an amount of 0.2 to 1 mol per mol of said triisobutylaluminum; and recovering the rubbery product so produced.

3. A process for preparing a rubbery polybutadiene containing a high percentage of 1,2-addition which comprises contacting 1,3-butadiene in a polymerization zone containing a hydrocarbon diluent with a catalyst comprising triisobutylaluminum and molybdenum pentachloride in the presence of tetrahydrofuran, the amount of said triisobutylaluminum being in the range of 0.9 to 3 mols per mol of said molybdenum pentachloride, and the amount of said tetrahydrofuran being in the range of 0.1 to 30 mols per mol of said molybdenum pentachloride, said contacting occurring at a temperature in the range of 0 to 150° C. and under autogenous pressure; adding to said polymerization zone iodine in an amount of 0.2 to 1 mol per mol of said triisobutylaluminum; and recovering the rubbery product so produced.

4. A process for preparing a rubbery polybutadiene containing a high percentage of 1,2-addition which comprises contacting 1,3-butadiene in a polymerization zone containing a hydrocarbon diluent with a catalyst comprising triethylaluminum and molybdenum pentachloride in the presence of diethyl ether, the amount of triethylaluminum being in the range of 0.9 to 3 mols per mol of said molybdenum pentachloride, and the amount of said diethyl ether being in the range of 0.1 to 30 mols per mol of said molybdenum pentachloride, said contacting occurring at a temperature in the range of 0 to 150° C. and under autogenous pressure; adding to said polymerization zone iodine in an amount of 0.2 to 1 mol per mol of said triethylaluminum; and recovering the rubbery product so produced.

5. A process for preparing a rubbery polybutadiene containing a high percentage of 1,2-addition which comprises contacting 1,3-butadiene in a polymerization zone containing a hydrocarbon diluent with a catalyst comprising tricyclohexylaluminum and molybdenum pentachloride in the presence of dimethyl ether, the amount of said tricyclohexylaluminum being in the range of 0.9 to 3 mols per mol of said molybdenum pentachloride, and the amount of said dimethyl ether being in the range of 0.1 to 30 mols per mol of said molybdenum pentachloride, said contacting occurring at a temperature in the range of 0 to 150° C. and under autogenous pressure; adding to said polymerization zone iodine in an amount of 0.2 to 1 mol per mol of said tricyclohexylaluminum; and recovering the rubbery product so produced.

References Cited in the file of this patent

UNITED STATES PATENTS

| | | |
|---|---|---|
| 2,976,271 | Lippincott | Mar. 21, 1961 |

FOREIGN PATENTS

| | | |
|---|---|---|
| 215,043 | Australia | Nov. 1, 1956 |
| 1,221,244 | France | Jan. 11, 1960 |
| 809,717 | Great Britain | Mar. 4, 1959 |
| 820,264 | Great Britain | Sept. 16, 1959 |